US012034860B2

(12) United States Patent
Liu (10) Patent No.: US 12,034,860 B2
(45) Date of Patent: Jul. 9, 2024

(54) MEMORY WRITE ACCESS CONTROL (71) Applicant: Micron Technology, Inc., Boise, ID (US)

(72) Inventor: Zhan Liu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 495 days.

(21) Appl. No.: 17/003,103

(22) Filed: Aug. 26, 2020

(65) Prior Publication Data

US 2022/0070004 A1 Mar. 3, 2022

(51) Int. Cl.
*H04L 9/32* (2006.01)
*G06F 3/06* (2006.01)
*G06F 21/60* (2013.01)
*H04L 9/30* (2006.01)

(52) U.S. Cl.
CPC .......... *H04L 9/3247* (2013.01); *G06F 3/0622* (2013.01); *G06F 3/0659* (2013.01); *G06F 3/0673* (2013.01); *G06F 21/602* (2013.01); *H04L 9/30* (2013.01); *H04L 9/3278* (2013.01)

(58) Field of Classification Search
CPC ....... H04L 9/3247; H04L 9/30; H04L 9/3278; H04L 9/32; G06F 3/0622; G06F 3/0659; G06F 3/0673; G06F 21/602; G06F 21/60
See application file for complete search history.

(56) References Cited

U.S. PATENT DOCUMENTS

| 9,672,395 B2 * | 6/2017 | Ryoo | G06K 7/0008 |
| 10,140,148 B1 * | 11/2018 | Kaplansky | G06F 12/1009 |
| 2009/0019275 A1 * | 1/2009 | Park | G06F 21/575 726/2 |
| 2009/0138720 A1 * | 5/2009 | Jeong | H04N 7/1675 713/176 |
| 2009/0217058 A1 * | 8/2009 | Obereiner | G06F 21/79 713/193 |
| 2012/0144198 A1 * | 6/2012 | Har | H04L 9/14 713/170 |
| 2015/0013015 A1 * | 1/2015 | Zheng | H04L 63/10 726/27 |
| 2015/0288661 A1 * | 10/2015 | Monk | H04L 63/101 726/12 |
| 2015/0294313 A1 * | 10/2015 | Kamal | G06Q 20/322 705/44 |
| 2018/0278413 A1 * | 9/2018 | Dover | G06F 21/64 |
| 2020/0177757 A1 * | 6/2020 | Ono | H04N 1/00891 |
| 2020/0374696 A1 * | 11/2020 | Zhou | H04W 12/069 |

* cited by examiner

*Primary Examiner* — Robert B Leung
*Assistant Examiner* — Howard H. Louie
(74) *Attorney, Agent, or Firm* — Holland & Hart LLP (57) ABSTRACT Methods, systems, and devices for memory write access control are described. In some examples, memory systems may include storage that is access-protected (e.g., write access protected). To enable access to the protected storage, a server node may communicate a command to the memory system that is signed with a private key that is inaccessible to the memory system. They memory system may verify the command using a public key and may enable access to the protected storage. Access commands associated with the protected storage may be processed until access to the protected storage is disabled.

14 Claims, 6 Drawing Sheets

MEMORY WRITE ACCESS CONTROL

BACKGROUND

The following relates generally to one or more memory systems and more specifically to memory write access control.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Computing systems generally include an operating system that manages hardware and software. A computing system may include files, such as log files, for recording data in a storage device (e.g., a memory device). Generally file access may be controlled by the operating system, which may grant access to one or more files based on attributes that are maintained for file-system partitions, directories, or folders. This type of access may be referred to as operating system-level access, file system-level access, or file-level access. Thus, access control for files on a storage device are generally tied to the computing system associated with the storage device and are not able to be moved or accessed from a different machine (e.g., a different computing system).

File-level access permissions are generally granted to a supervisor, such as an administrator or root user. In some instances a root user may be able to access all of the files on a storage device, yet the root user may not be the owner of all of the files. In some instances, hackers may gain root permissions through malicious acts, and thus may gain access to all of the files on a storage device. Accordingly, a system that grants access control to the owner of a storage device, while preventing access by other users including a root user, may be desirable.

Methods and systems for granting access control to owners of storage devices are described herein. Access control for a storage area for files (such as log files) may be enabled using public/private key pairs, such as public-key cryptography (e.g., public-key authentication). To grant access (e.g., write access), a command may be signed using a private key belonging to a server associated with the owner (e.g., by generating a hash of the command and generating a signature of the hash using the private key). The storage device may store a public key that corresponds to the private key, and may use the public key to verify the command (e.g., by verifying the signed hash using the public key). The memory device may also have a physically unclonable function (PUF) for generating public/private key pairs for a device key for responsive commands to the owner. By granting access control for files to an owner, the systems and methods described herein may prevent malicious actors from gaining access to files stored to a storage device.

Features of the disclosure are initially described in the context of systems as described with reference to FIGS. 1 and 2. Features of the disclosure are described in the context of a process flow diagram as described with reference to FIG. 3. These and other features of the disclosure are further illustrated by and described with reference to an apparatus diagram and flowcharts that relate to memory write access control as described with reference to FIGS. 4-6.

Figure 1:
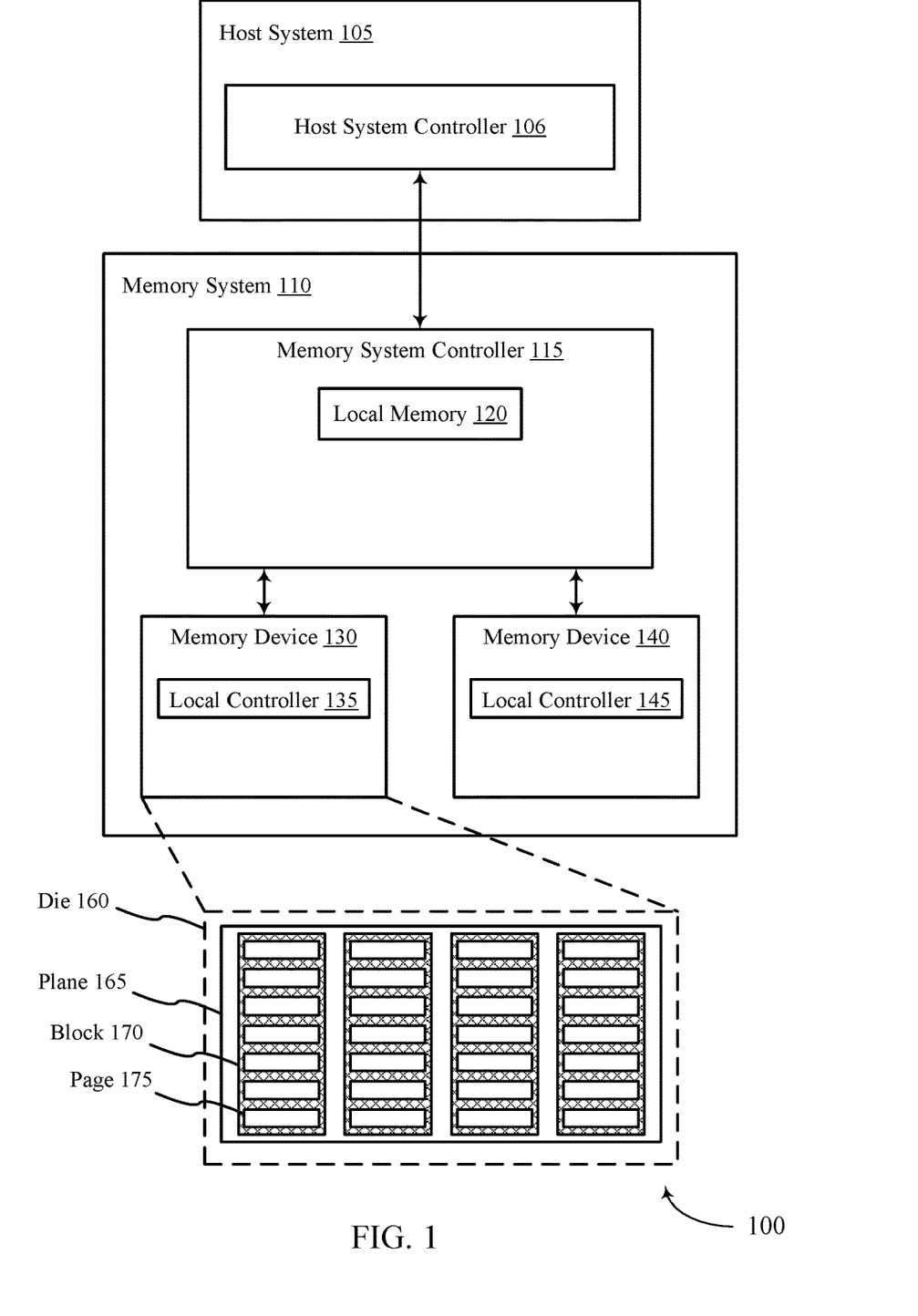
FIG. 1 illustrates an example of a system that supports memory write access control in accordance with examples as disclosed herein.

FIG. 1 is an example of a system 100 that supports memory write access control in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support memory write access control. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform one or more associated functions as described herein.

In some examples, the memory system 110 may include storage that is access-protected. For example, the memory device 130 may be access-protected, and may be accessed upon being enabled (e.g., unlocked) by a server associated with an owner of the memory system 110, which may be the same or different than the host system 105 (e.g., access commands from a server external to host system 105 may be sent via host system 105). To enable the memory device 130 or portions of the memory device 130 for write access, the server may communicate a signed command to the memory system 110. The command may be signed using a key that is accessible to only the server (e.g., an inaccessible to the memory system 110). The memory system 110 may include a public key that may be used to verify the signed command. Upon verifying the command the memory device 130 may be enabled for write access and write access operations may be performed on the memory device 130.

Once the memory device 130 is enabled for write access, write access operations may be performed until the memory device 130 is disabled (e.g., until the memory device 130 is write-access disabled). To disable write access to the memory device 130, the server (e.g., via host system 105) may communicate a signed command (e.g., a second signed command) to the memory system 110. The command may be signed using the key that is accessible to only the server and may be verified using the public key maintained by the memory system 110. When the command is verified, the memory device 130 may be disabled (e.g., write access operations may not be performed on the memory device 130). By enabling write access to the memory device 130 as described herein, write access may be controlled by the server, which may prevent malicious actors from gaining access to data stored to the memory system 110 (e.g., even when root access is obtained for host system 105).

Figure 2:
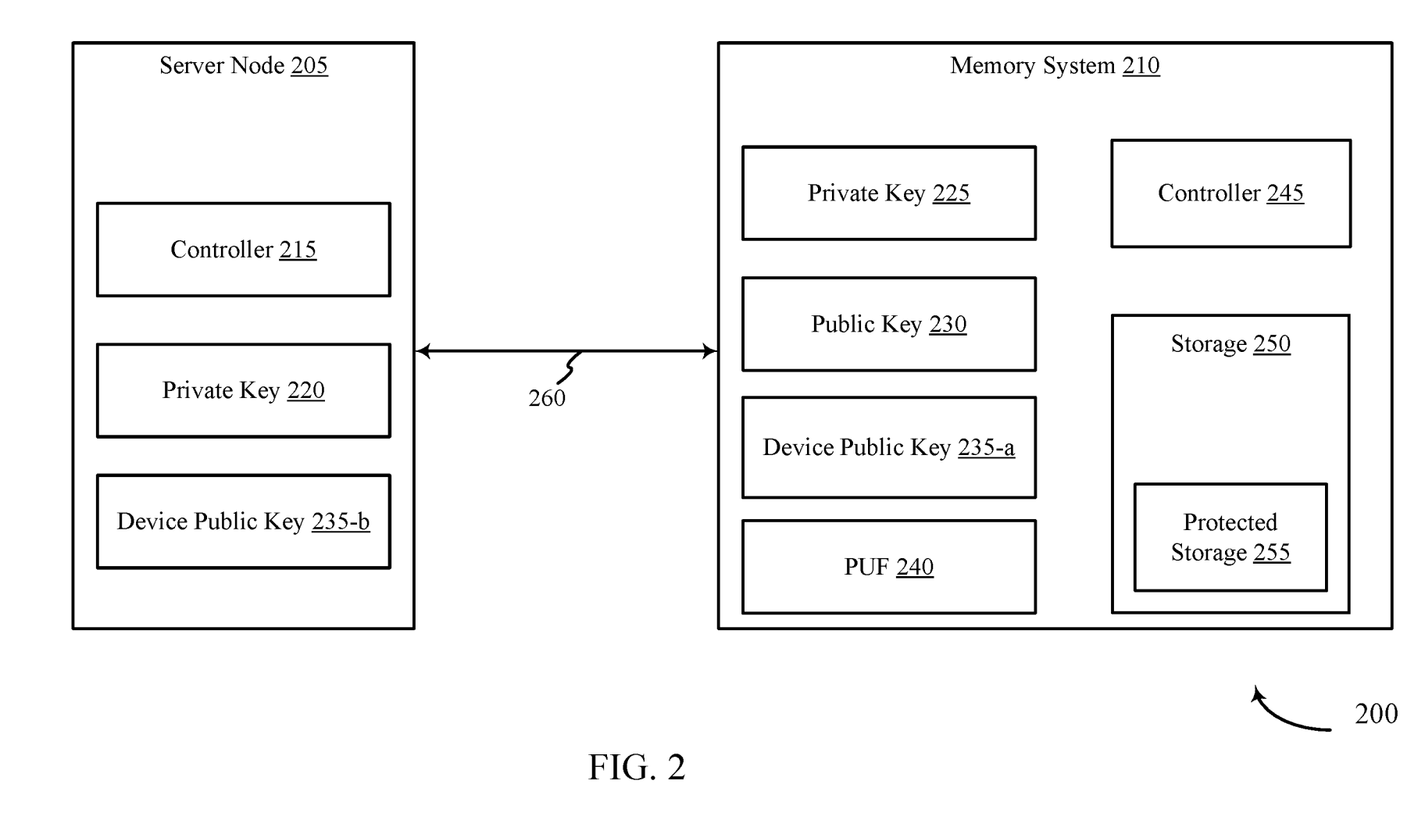
FIG. 2 illustrates an example of a system that supports memory write access control in accordance with examples as disclosed herein.

FIG. 2 illustrates an example of a system 200 that supports memory write access control in accordance with examples as disclosed herein. The system 200 may include a server node 205 and a memory system 210, which may be examples of the server or host system 105 and the memory system 110 described with reference to FIG. 1. The server node 205 may communicate with the memory system 210 to enable access (e.g., write access) to a protected portion (e.g., a protected portion of storage) of the memory system 210. That is, the server node 205 may enable (or disable) access control to the memory system 210, which may prevent malicious actors from gaining access to data stored to the memory system 210. The server node 205 may be directly connected to the memory system 210, or the server node 205 may be connected to the memory system 210 via other nodes. For example, connection 260 between server node 205 and memory system 210 may include one or more networks such as local area networks or the Internet.

The server node 205 may be configured to generate commands to enable access (e.g., write access) to the memory system 210. In some examples, the server node 205 may be an example of a server, a computing device, a host computing device, or the like. The server node 205 may include a controller 215 (or a similar device, such as a processor) that is configured to generate commands to be communicated to the memory system 210. For example, the controller 215 may generate commands to enable access (e.g., write access) to a portion of the memory system 210 and commands for disabling access (e.g., write access) to a portion of the memory system 210.

The server node 205 may include one or more keys that are used to sign (e.g., encrypt) or verify (e.g., decrypt) commands. For example, the server node 205 may include a private key 220 that is used to sign a command for enabling access (e.g., write access) to a portion of the memory system 210. The private key 220 may be known and/or accessible only to the server node 205, may represent a private key used in a public-key cryptography (e.g., public key infrastructure (PKI)) scheme.

To enable access to a portion of the memory system 210, the server node 205 may generate a command that includes an address space of the memory system 210. The command may be signed (e.g., encrypted using a public-key cryptography scheme) using the private key 220. Since the private key 220 is accessible to only the server node 205, the memory system 210 may verify the command comes from the server node 205 by decrypting the command using the corresponding public key. Accordingly, the server node 205 may control file system level access to the memory system 210, which may prevent other users (e.g., a root user of a host system connected to memory system 210) from gaining access to data stored to the memory system 210.

In some examples, the server node 205 may include a copy of a device public key 235-*b* received from the memory system 210. As described herein, the memory system 210 may include a physical unclonable function PUF 240. The PUF 240 may generate a device public key 235-*a* that may be communicated to the server node 205 and may be used to verify (e.g., decrypt) one or more commands generated by the memory system 210 (e.g., and communicated to the server node 205). Accordingly, the server node 205 may store a copy of the device public key 235-*b* to verify commands received from the memory system 210.

The memory system 210 may be configured to receive commands from the server node 205 that enable access (e.g., write access) to the protected storage 255. In some examples, the memory system 210 may be an example of a system within a computing device. In other examples, the memory system 210 may be an example of a memory device (e.g., a non-volatile memory device) and/or may include multiple memory devices (e.g., non-volatile memory devices).

As shown in FIG. 2, the memory system 210 may include storage 250, which may include one or more memory cells, such as non-volatile memory cells (e.g., flash memory cells). In some examples, the storage 250 may include a portion that is protected (e.g., protected storage 255). For example, the protected storage 255 may be a subset of the storage 250 that includes an address space (e.g., a range of memory addresses that are protected). In other examples, the protected storage 255 may include the entire storage 250 of the memory system 210 other than a portion reserved to store one or more keys.

In some examples, the protected storage 255 may be configured to store communications between the memory system 210 and users of the memory system 210 (e.g., users of a device associated with the memory system 210). The communications may be stored as a transaction log (e.g., a log file) that captures the type, content, and/or time of transactions made by a person from a terminal associated with the memory system 210. When the protected storage 255 is enabled for access (e.g., enabled for write access), log files may be written to the protected storage 255 and/or log files previously stored to the protected storage 255 may be modified. Accordingly, a user may be granted access by the server node 205, which may prevent actors that otherwise have file-level access (e.g., root access) from modifying data stored to the protected storage 255 when write access is not enabled by the server node 205.

The memory system 210 may include a controller 245 that is configured to receive and process commands received from the server node 205. For example, the controller 245 may receive signed commands for enabling access (e.g., write access) to the protected storage 255. Accordingly, the controller 245 may access one or more keys (such as public key 230 as described herein) and may use the keys to verify (e.g., decrypt) signed commands. Additionally or alternatively, the controller 245 may receive signed commands for disabling access (e.g., write access) to the protected storage 255 and may generate commands to be communicated to the server node 205. In some examples, the controller 245 may sign commands to be transmitted to the server node 205 using a private key of the memory system 210 (e.g., using private key 225).

The memory system 210 may include one or more keys that are used to verify (e.g., decrypt) or sign (e.g., encrypt) commands. For example, the memory system 210 may include a public key 230 that is associated with the private key 220 of the computing node. The public key may be stored to a portion of the storage 250 that is protected (e.g., protected storage 255), in some cases. Alternatively, the public key may be stored in a portion of storage 250 or controller 245 only accessible via a separate interface (e.g., not via an interface coupled with connection 260 between server node 205 and memory system 210). For example, the public key 230 may represent the public key used in the public-key cryptography scheme for enabling access to the protected storage 255. Accordingly, when a signed command is received from the server node 205, the controller 245 may use the public key 230 to verify (e.g., decrypt) the command.

Upon verifying the signed command, access to the protected storage 255 may be enabled and any subsequent commands (e.g., write commands) to the protected storage 255 may be processed (e.g., by the controller 245). For example, the controller 245 may process access commands (e.g., write commands) for the memory system 210. In some examples, the access commands may be associated with the unlocked protected storage 255. Additionally or alternatively, the controller 245 may process access commands for portions of the memory system 210 that are not access protected (e.g., not write protected).

The memory system 210 may also include a private key 225 for signing commands communicated to the server node 205. For example, the private key 225 may be used to sign a command indicating that write access to the protected storage 255 is enabled. The command may be communicated with (or in addition to) a device public key 235-a, which may be used by the server node 205 to validate the signed command. The private key 225 and the device public key 235-a may be examples of a public-key cryptography scheme. As described herein, the device public key 235-a may be generated by the PUF 240 (e.g., a component configured to generate a PUF). The PUF 240 may provide a physically-defined digital fingerprint that serves as a unique identifier. The device public key 235-a may be communicated with the digital fingerprint that identifies the memory system 210 as the source of the command. The server node 205 may verify the digital fingerprint before verifying the command (e.g., using the device public key 235-b) to ensure the command was received from a trusted source. Upon verifying the command, the memory system 210 may process access commands (e.g., write commands) to the enabled (e.g., unlocked) protected storage 255.

By way of example, the controller 215 of the server node 205 may generate a command for enabling write access to log files of the protected storage 255. The command may be signed using the private key 220. The command may be communicated to the memory system 210 and processed by the controller 245. The controller 245 may verify the signed command using the public key 230 and, upon verifying the command, enable write access to the log files of the protected storage 255. Log files may then be written to the protected storage 255 and/or existing log files stored to the protected storage 255 may be modified.

In some examples, the controller 245 may generate a signed command, using the private key 225, to acknowledge that write access to the protected storage 255 is enabled. The signed command may be communicated with a device public key 235-a that is generated using the PUF 240. The server node 205 may verify the signed command using the device public key 235-b and, subsequently, may transmit an additional signed command to disable write access to the protected storage 255. The additional command may be signed using the private key 220, and the controller 245 may verify the signed command using the public key 230. Upon verifying the additional command, write access to log files of the protected storage 255 may be disabled. By using the methods described herein for enabling write access to the protected storage 255, the server node 205 may control access to the memory system 210, which may prevent malicious actors from gaining access to data stored to the memory system 210.

Figure 3:
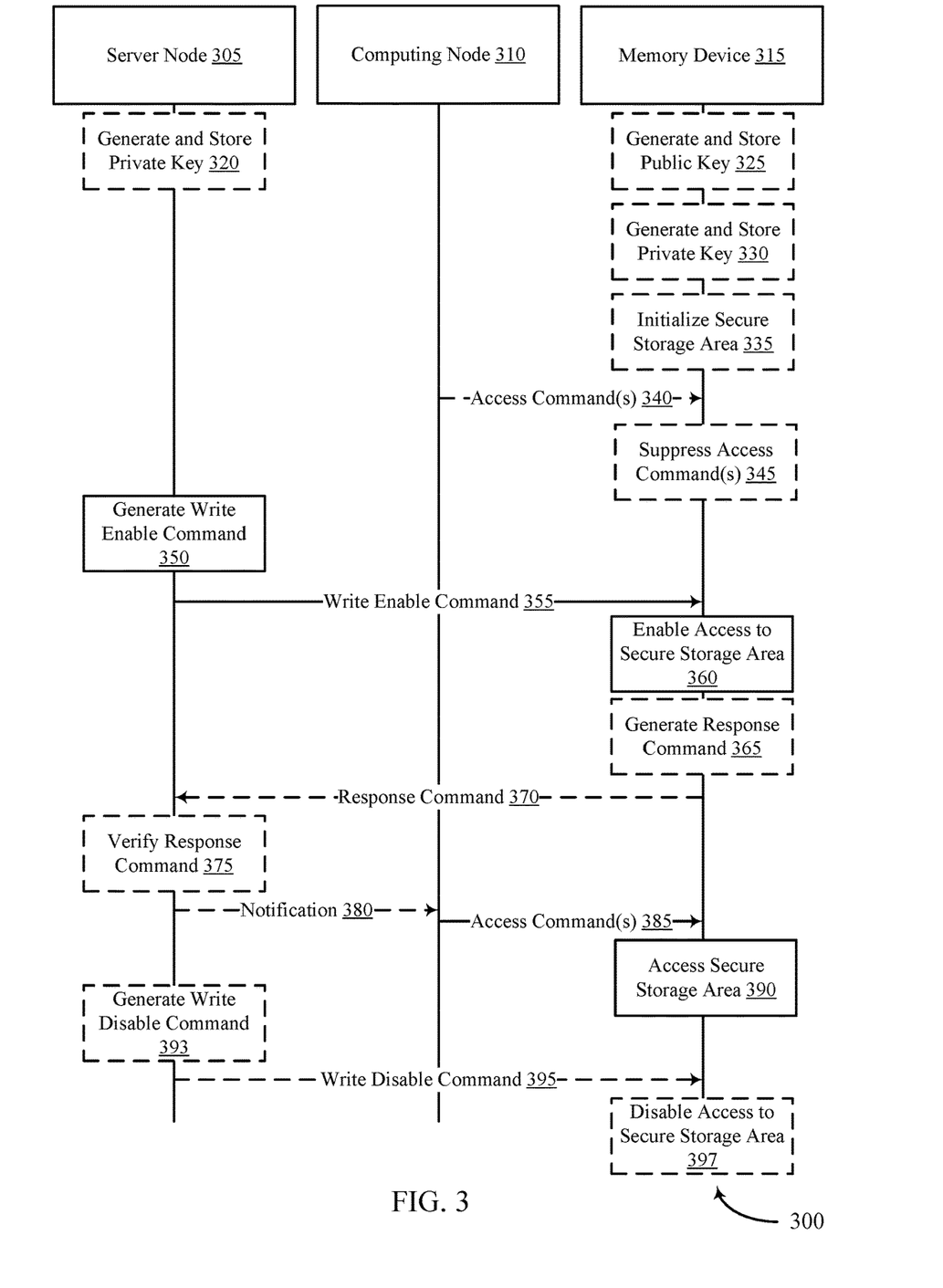
FIG. 3 illustrates an example of a process flow diagram that supports memory write access control in accordance with examples as disclosed herein.

FIG. 3 illustrates an example of a process flow diagram 300 that supports memory write access control in accordance with examples as disclosed herein. The process flow diagram 300 may operations performed at or by a server node 305, a computing node 310, and a memory device 315. In some examples, the server node 305 may be an example of the server node 205 and the memory device 315 may be an example of the memory system 210, or a component of the memory system 210, as described with reference to FIG. 2. Additionally or alternatively, the computing node 310 may be a component of the host system 105 as described with reference to FIG. 1 or may be an example of a node that is in-between server node 305 and memory device 315. In some examples, the server node 305 and the computing node 310 may be associated with a same owner (e.g., a same entity, a same organization, a same business, etc.). In other instances, the server node 305 may be associated with an owner of the memory device 315, while the computing node 310 is an independent node.

The server node 305 may communicate with the memory device 315 to enable access (e.g., write access) to a protected portion (e.g., a protected portion of storage) of the memory device 315. Upon enabling access, the computing node 310 may access (e.g., via one or more access commands) the protected portion of the memory device 315. Thus the server node 305 may control access to the memory device 315, which may prevent malicious actors from gaining access to data stored to the memory device 315 via the computing node 310.

At 320, a private key may be generated and stored at the server node 305. The private key may represent a private key used in a public-key cryptography scheme and may be generated and/or stored during a manufacturing process of the server node 305 and/or memory device 315. As described herein, the private key may be accessible to only the server node 305 and may be used to control system, block, partition, directory, or file-level access to the memory device 315.

At 325, a public key corresponding to the private key (e.g., generated and stored at 320) may be generated and stored to the memory device 315. The public key may represent a public key corresponding to a private key used in a public-key cryptography scheme and may be generated and/or stored during a manufacturing process of the server node 305 and/or memory device 315. The public key may be stored to a portion of the memory device 315 that is access-protected (e.g., write access protected) and may be used to verify commands signed using the private key. Alternatively, the public key may be stored in an area that is inaccessible via access commands (e.g., not within an address space of memory device 315), or in an area that is not access-protected. Verifying signed commands may grant system, block, partition, directory, or file-level access of the memory device 315 to the computing node 310.

At 330, a private key may be generated and stored at the memory device 315. The private key may represent a private key used in a public-key cryptography scheme and may be generated and/or stored during a manufacturing process of the memory device 315. The private key may be stored to a portion of the memory device 315 that may be accessible to only the memory device 315, or may be accessible only via an interface separate from the interface used for connecting memory device 315 to computing node 310 (e.g., local interface). In some examples, the private key may be used to sign commands communicated to the server node 305. In some examples, the signed commands may be communicated with a device public key (e.g., a device public key 235-a as described with reference to FIG. 2).

At 335, a secure storage area of the memory device 315 may be initialized. As described with reference to FIG. 2, the secure storage area (e.g., the protected storage 255) may be configured to store data such as log files. Thus, at 335, an address range of the storage of the memory device 315 may be designated (e.g., set, allocated) as a secure storage area. When a signed command for enabling access to the secure storage area is verified, the computing node 310 may access the secure storage area. Although shown in a set sequential order, the operations at 320, 325, 330, and 335 may be performed serially or simultaneously, and may be performed in a different order than shown in FIG. 3.

At 340, the computing node 310 may optionally send one or more access commands to the memory device 315. The access commands may be associated with the secure storage area. At 345, the memory device 315 may optionally suppress the one or more access commands due to the secure storage area being access-protected (e.g., write protected). For example, the memory device 315 may suppress write access commands for the locked secure storage area, while the memory device 315 may perform read access commands for the locked secure storage area. In some examples, the memory device 315 may identify that an address (e.g., an address range) indicated by the access commands is associated with the locked storage area and may effectively ignore (e.g., not process) the associated commands (e.g., write access commands). The memory device 315 may indicate to the computing node 310 (e.g., via a notification; not shown) that the access commands were suppressed.

At 350, the server node 305 may generate a write enable command. As described herein, the write enable command may be signed (e.g., encrypted) using a private key accessible to only the server node 305 (e.g., the private key generated and stored at 320). In some examples, a hash of the write enable command may be generated. After generating the hash, the hash may be signed using the private key before being communicated to the memory device 315. The write enable command may indicate an address space or range of the secure storage area to enable (e.g., unlock) or may indicate that the entire secure storage area is to be enabled. At 355, the signed write enable command may be communicated to the memory device 315.

At 360, the memory device 315 may enable access to the portion of the secure storage area indicated by the write enable command. The memory device 315 may enable access by verifying (e.g., decrypting) the signed command using the public key that corresponds to the private key used to sign the write enable command (e.g., the public key generated and stored at 325). In some examples, the memory device 315 may verify the signed hash (e.g., the hash of the write enable command) using the public key. When the write enable command is verified, the portion of the secure storage area indicated by the command (e.g., the address space or range indicated by the command) may be enabled for write access.

At 365, the memory device may optionally generate a response command in response to enabling access to the portion of the secure storage area. The response command may be signed (e.g., encrypted) using a private key accessible to only the memory device 315 (e.g., the private key generated and stored at 330). The response command may indicate that a portion of the secure storage area is enabled for access (e.g., write access). In some examples, a device public key may be generated in addition to generating the response command. The device public key may be generated using a PUF (e.g., a PUF component 240 as described with reference to FIG. 2) and may be communicated with or in addition to the response command. The device public key may be used by the server node 305 to verify (e.g., decrypt) the response command.

At 370, the response command may optionally be communicated to the server node 305. In some examples, the device public key may be communicated with or in addition to (e.g., separately from) the response command. At 375, the server node 305 may optionally verify (e.g., decrypt) the response command using the device public key. At 380, the server node 305 may optionally transmit a notification to the computing node 310 that indicates the portion of the secure storage area is enabled for access (e.g., write access).

At 385, the computing node 310 may communicate one or more access commands (e.g., write commands) to the enabled portion of the secure storage area. As described herein, the enabled portion of the secure storage area may be for storing log files and thus the access commands communicated form the computing node 310 to the memory device 315 may be for writing log files to and/or editing log files stored to the secure storage area. At 390, the enabled portion of the secure storage area may be accessed (e.g., via access command(s)).

At 393, the server node 305 may optionally generate a write disable command. As described herein, the write disable command may be signed (e.g., encrypted) using a private key accessible to only the server node 305 (e.g., the private key generated and stored at 320). The write disable command may disable the address space of the secure storage area previously enabled (e.g., at 360). At 395, the signed write disable command may optionally be communicated to the memory device 315.

At 397, the memory device 315 may optionally disable access to the portion of the secure storage area previously enabled. The memory device 315 may disable access by verifying (e.g., decrypting) the signed command using the public key that corresponds to the private key used to sign the write disable command (e.g., the public key generated and stored at 325). When the write disable command is verified, the portion of the secure storage area indicated by the command (e.g., the address space indicated by the command) may be disabled for access (e.g., for write access).

Aspects of the process flow 300 may be implemented by a controller, among other components. Additionally or alternatively, aspects of the process flow 300 may be implemented as instructions stored in memory (e.g., firmware stored in a memory coupled with the memory device 315). For example, the instructions, when executed by a controller (e.g., the controller 245 and/or the controller 215 as described with reference to FIG. 2), may cause the controller to perform the operations of the process flow 300.

Figure 4:
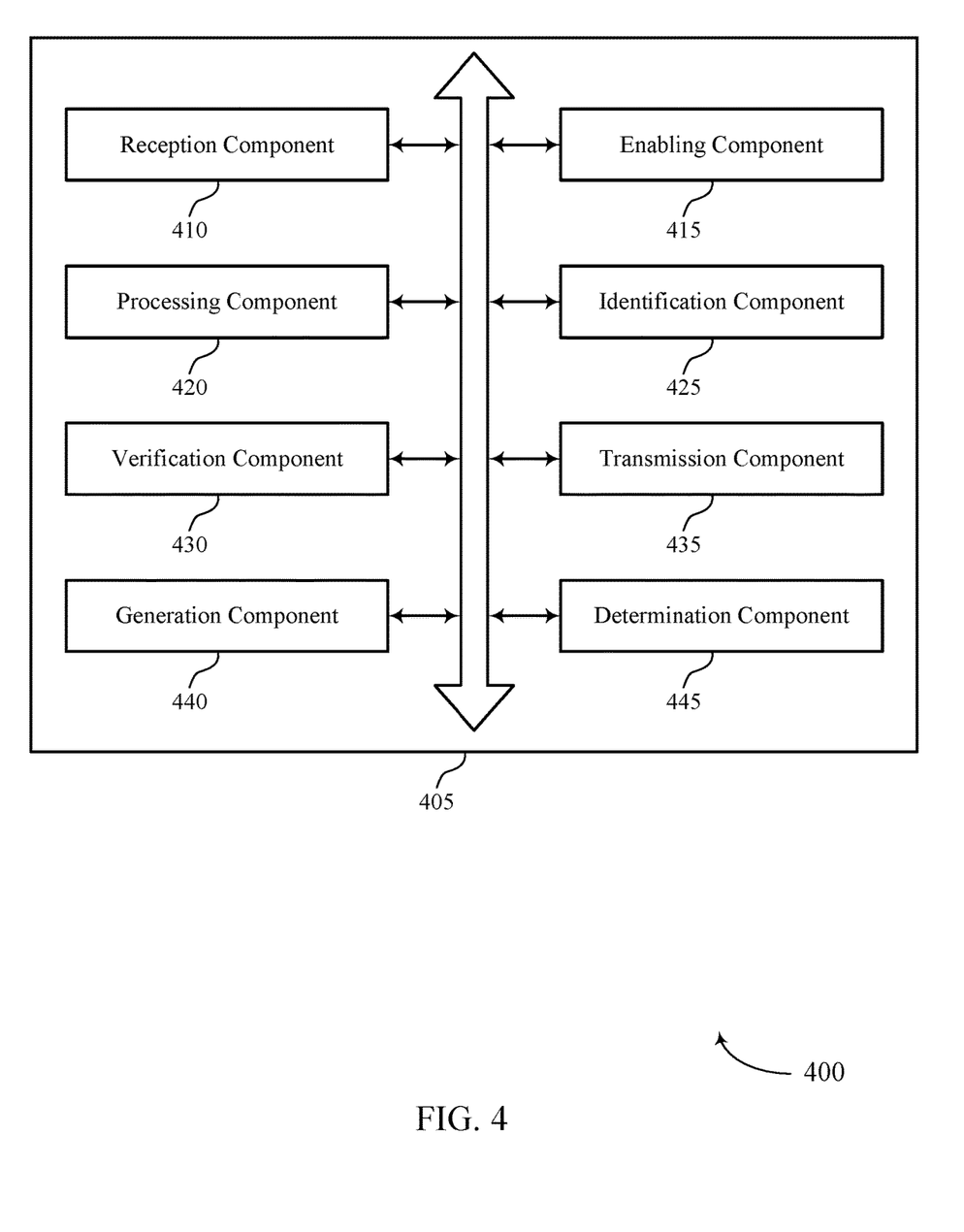
FIG. 4 shows a block diagram of a memory device that supports memory write access control in accordance with aspects of the present disclosure.

FIG. 4 shows a block diagram 400 of a memory device 405 that supports memory write access control in accordance with examples as disclosed herein. The memory device 405 may be an example of aspects of a memory device and/or a memory system as described with reference to FIGS. 2 and 3. The memory device 405 may include a reception component 410, an enabling component 415, a processing component 420, an identification component 425, a verification component 430, a transmission component 435, a generation component 440, and a determination component 445. Each of these modules may communicate, directly or indirectly, with one another (e.g., via one or more buses).

The reception component 410 may receive, by a memory device, a command to enable write access to a portion of the memory device, where the command is signed using a private key associated with a server. In some examples, the reception component 410 may receive, by the memory device, a write command to an address of the portion of the memory device. In some examples, the reception component 410 may receive, by a memory device, a write command to an address of a portion of the memory device that is write protected using a key pair including a public key and a private key associated with a server that is external to the memory device.

In some examples, the reception component 410 may receive, by the memory device, a second command for disabling the write access to the portion of the memory device after processing the write command, where the second command is signed using the private key. In some examples, the reception component 410 may receive, by the memory device, a command to enable write access to the portion of the memory device based on transmitting the notification to the server, where the command is signed using the private key associated with the server. In some examples, the reception component 410 may receive, by the memory device, a second write command to the address of the portion of the memory device.

The enabling component 415 may enable, by the memory device, write access to the portion of the memory device based on authenticating the command using a public key. In some examples, the enabling component 415 may enable, by the memory device, write access to the portion of the memory device based on authenticating the command using the public key.

The processing component 420 may process, by the memory device, the write command based on enabling write access to the portion of the memory device. In some examples, the processing component 420 may refrain from processing, by the memory device, the write command based on determining that the portion of the memory device is write protected. In some examples, the processing component 420 may process, by the memory device, the second write command based on enabling write access to the portion of the memory device.

The identification component 425 may identify, by the memory device, the portion of the memory device for write access at least in part on receiving the command, where enabling the write access to the portion of the memory device is based on the identifying.

The verification component 430 may verify, by the memory device, the signature of the command using the public key that corresponds to the private key associated with the server, where processing the write command is based on verifying the signed command.

The transmission component 435 may transmit, from the memory device, a third command that is signed using a private key of the memory device, where the third command is configured to indicate that the command was authenticated. In some examples, the transmission component 435 may transmit, from the memory device, the device public key to the server. In some examples, the transmission component 435 may transmit the notification to the server.

The generation component 440 may generate, at the memory device and using a physical unclonable function (PUF), a device public key for verifying the third command. In some examples, the generation component 440 may generate, by the memory device, a notification based on refraining from processing the write command, the notification indicating that the write command was not processed.

The determination component 445 may determine that the portion of the memory device is write protected based on receiving the write command.

Figure 5:
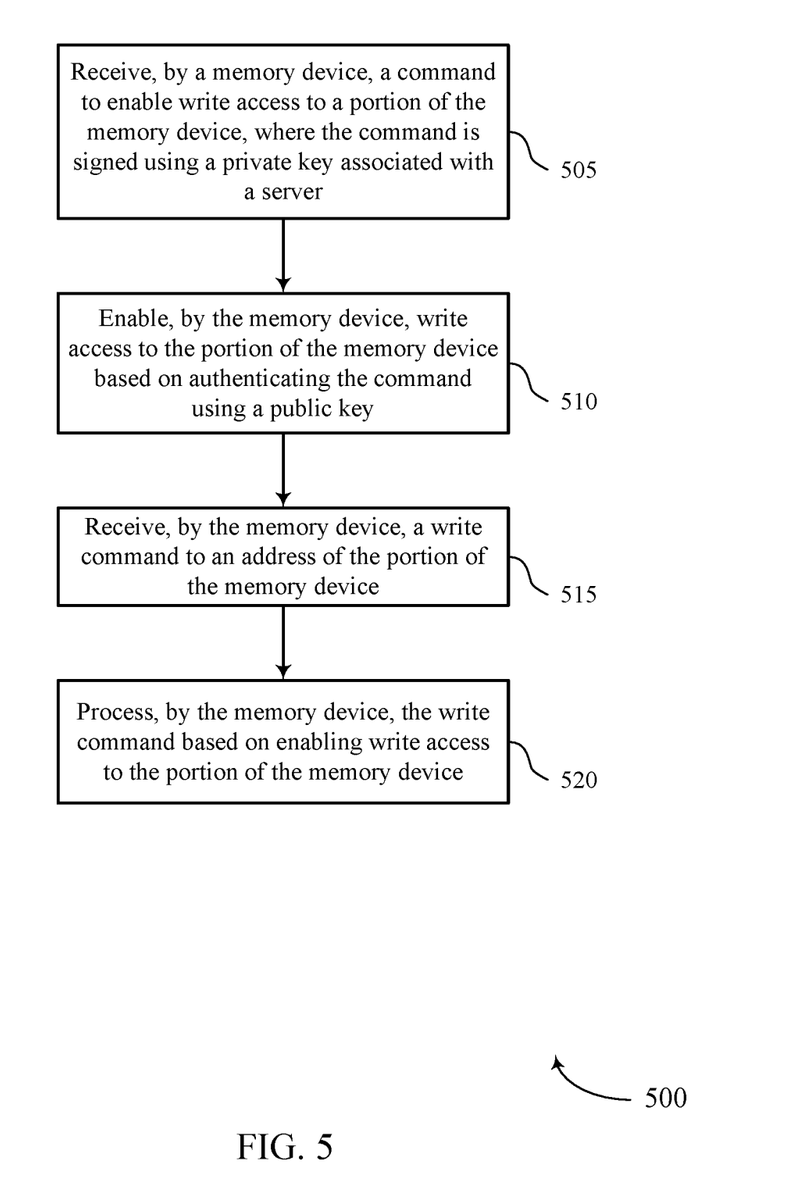
FIGS. 5 and 6 show flowcharts illustrating a method or methods that support memory write access control in accordance with examples as disclosed herein.

FIG. 5 shows a flowchart illustrating a method or methods 500 that supports memory write access control in accordance with aspects of the present disclosure. The operations of method 500 may be implemented by a memory device or its components as described herein. For example, the operations of method 500 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 505, a command to enable write access to a portion of a memory device may be received. The command may be signed using a private key associated with a server. The operations of 505 may be performed according to the methods described herein. In some examples, aspects of the operations of 505 may be performed by a reception component as described with reference to FIG. 4.

At 510, write access to the portion of the memory device may be enabled based on authenticating the command using a public key. The operations of 510 may be performed according to the methods described herein. In some examples, aspects of the operations of 510 may be performed by an enabling component as described with reference to FIG. 4.

At 515, a write command to an address portion of the memory device may be received. The operations of 515 may be performed according to the methods described herein. In some examples, aspects of the operations of 515 may be performed by a reception component as described with reference to FIG. 4.

At 520, the write command may be processed based on enabling write access to the portion of the memory device. The operations of 520 may be performed according to the methods described herein. In some examples, aspects of the operations of 520 may be performed by a processing component as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for receiving, by a memory device, a command to enable write access to a portion of the memory device, where the command is signed using a private key associated with a server, enabling, by the memory device, write access to the portion of the memory device based on authenticating the command using a public key, receiving, by the memory device, a write command to an address of the portion of the memory device, and processing, by the memory device, the write command based on enabling write access to the portion of the memory device.

Some examples of the method 500 and the apparatus described herein may further include operations, features, means, or instructions for identifying, by the memory device, the portion of the memory device for write access at least in part on receiving the command, where enabling the write access to the portion of the memory device may be based on the identifying.

Some examples of the method 500 and the apparatus described herein may further include operations, features, means, or instructions for receiving, by the memory device, a second command for disabling the write access to the portion of the memory device after processing the write command, where the second command may be signed using the private key.

In some examples of the method 500 and the apparatus described herein, authenticating the command may include operations, features, means, or instructions for verifying, by the memory device, the signature of the command using the public key that corresponds to the private key associated with the server, where processing the write command may be based on verifying the signed command.

Some examples of the method 500 and the apparatus described herein may further include operations, features, means, or instructions for transmitting, from the memory device, a third command that may be signed using a private key of the memory device, where the third command may be configured to indicate that the command was authenticated.

Some examples of the method 500 and the apparatus described herein may further include operations, features, means, or instructions for generating, at the memory device and using a physical unclonable function (PUF), a device public key for verifying the third command, and transmitting, from the memory device, the device public key to the server.

In some examples of the method 500 and the apparatus described herein, the portion of the memory device may be associated with a corresponding portion of a first address space of the memory device, and where the public key may be stored to a second address space that may be exclusive of the first address space.

In some examples of the method 500 and the apparatus described herein, the first address space may be accessible upon authenticating the command using the public key, and where and the second address space may be accessible to only the memory device.

Figure 6:
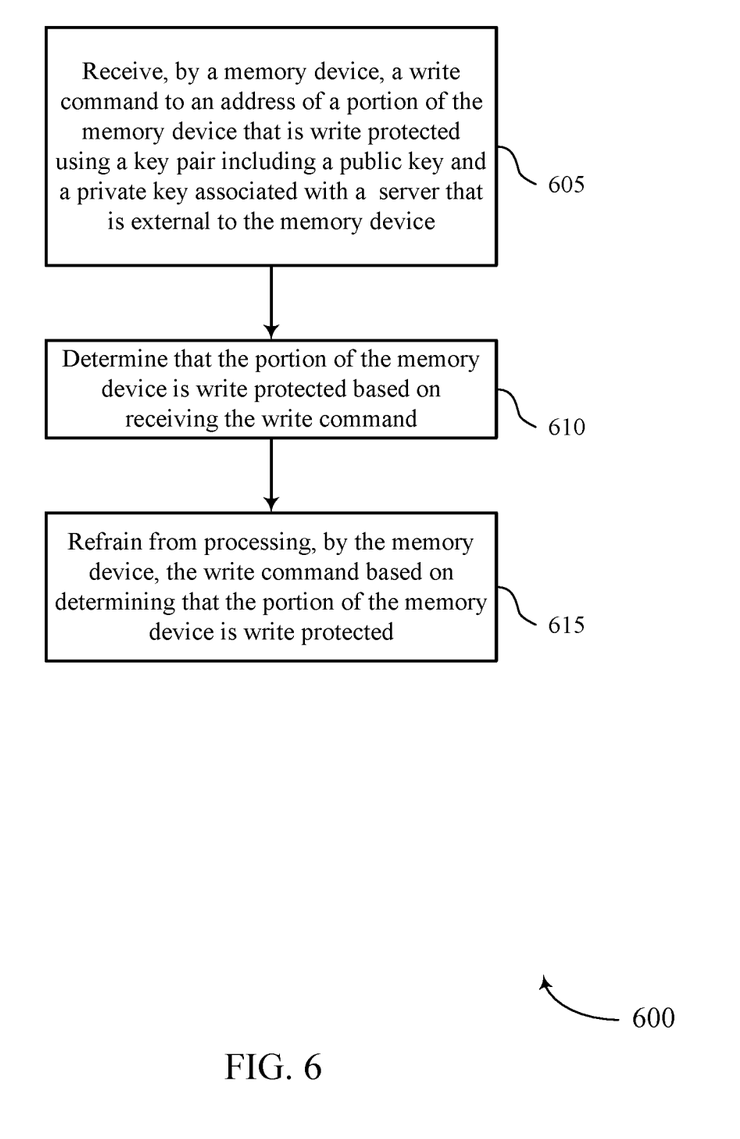

FIG. 6 shows a flowchart illustrating a method or methods 600 that supports memory write access control in accordance with aspects of the present disclosure. The operations of method 600 may be implemented by a memory device or its components as described herein. For example, the operations of method 600 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 605, a write command to an address of a portion of a memory device that is write protected using a key pair including a public key and a private key associated with a server that is external to the memory device may be received. The operations of 605 may be performed according to the methods described herein. In some examples, aspects of the operations of 605 may be performed by a reception component as described with reference to FIG. 4.

At 610, the portion of the memory device that is write protected may be determined based on receiving the write command. The operations of 610 may be performed according to the methods described herein. In some examples, aspects of the operations of 610 may be performed by a determination component as described with reference to FIG. 4.

At 615, the write command may be refrained from processing based on determining that the portion of the memory device is write protected. The operations of 615 may be performed according to the methods described herein. In some examples, aspects of the operations of 615 may be performed by a processing component as described with reference to FIG. 4.

In some examples, an apparatus as described herein may perform a method or methods, such as the method 600. The apparatus may include features, means, or instructions (e.g., a non-transitory computer-readable medium storing instructions executable by a processor) for receiving, by a memory device, a write command to an address of a portion of the memory device that is write protected using a key pair including a public key and a private key associated with a server that is external to the memory device, determining that the portion of the memory device is write protected based on receiving the write command, and refraining from processing, by the memory device, the write command based on determining that the portion of the memory device is write protected.

Some examples of the method 600 and the apparatus described herein may further include operations, features, means, or instructions for generating, by the memory device, a notification based on refraining from processing the write command, the notification indicating that the write command was not processed, and transmitting the notification to the server.

Some examples of the method 600 and the apparatus described herein may further include operations, features, means, or instructions for receiving, by the memory device, a command to enable write access to the portion of the memory device based on transmitting the notification to the server, where the command may be signed using the private key associated with the server, enabling, by the memory device, write access to the portion of the memory device based on authenticating the command using the public key, receiving, by the memory device, a second write command to the address of the portion of the memory device, and processing, by the memory device, the second write command based on enabling write access to the portion of the memory device.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A non-transitory computer-readable medium storing code comprising instructions which, when executed by one or more processors of one or more memory devices, cause the one or more memory devices to:
   receive a command to enable write access to a portion of the one or more memory devices, wherein the command is signed using a private key accessible only by a server;
   enable write access to the portion of the one or more memory devices based at least in part on authenticating the command using a public key;
   receive a write command to an address of the portion of the one or more memory devices;
   process the write command based at least in part on enabling write access to the portion of the one or more memory devices;
   receive a second command for disabling the write access to only the portion of the one or more memory devices after processing the write command, wherein the second command is signed using the private key;
   transmit a third command, wherein the third command comprises an indication that the command was not authenticated, wherein the third command is signed using a private key that is specific to the one or more memory devices; and
   transmit a fourth command, wherein the fourth command comprises a key for verifying the third command.

2. The non-transitory computer-readable medium of claim 1, wherein the instructions, when executed by the one or more processors of the one or more memory devices, further cause the one or more memory devices to:
   identify the portion of the one or more memory devices for write access based at least in part on receiving the command, wherein enabling the write access to the portion of the one or more memory devices is based at least in part on the identifying.

3. The non-transitory computer-readable medium of claim 1, wherein the instructions, when executed by the one or more processors of the one or more memory devices, further cause the one or more memory devices to:
   verify the signature of the command using the public key that corresponds to the private key associated with the server, wherein processing the write command is based at least in part on verifying the signature of the command.

4. The non-transitory computer-readable medium of claim 1, wherein the instructions, when executed by the one or more processors of the one or more memory devices, further cause the one or more memory devices to:
   generate a device public key using a physical unclonable function (PUF) for verifying the third command; and
   transmit the device public key to the server.

5. The non-transitory computer-readable medium of claim 1, wherein the portion of the one or more memory devices is associated with a corresponding portion of a first address space of the one or more memory devices, and wherein the public key is stored to a second address space that is exclusive of the first address space.

6. The non-transitory computer-readable medium of claim 5, wherein the first address space is accessible upon authenticating the command using the public key, aid wherein the second address space is accessible to only the one or more memory devices.

7. A system, comprising:
   one or more memory devices configured to be allocated for write access, the one or more memory devices configured to:
   receive a command from a computing node to enable write access to a portion of storage, wherein the command is signed using a private key accessible only by the computing node;

enable write access to the portion of storage based at least in part on authenticating the command using a public key;
receive a write command to an address of the portion of storage;
process the write command based at least in part on enabling write access to the portion of storage;
receive a second command for disabling the write access to only the portion of the one or more memory devices after processing the write command, wherein the second command is signed using the private key;
transmit a third command to the computing node, wherein the third command comprises an indication that the command was not authenticated, wherein the third command is signed using a private key that is specific to the one or more memory devices; and
transmit a fourth command to the computing node, wherein the fourth command comprises a key for verifying the third command.

8. The system of claim 7, wherein the one or more memory devices are configured to:
identify the portion for write access at least in part on receiving the command, wherein enabling the write access to the portion of the one or more memory devices is based at least in part on the identifying.

9. The system of claim 7, further comprising:
the computing node, wherein the computing node is configured to:
sign the command using the private key that is accessible only to the computing node.

10. The system of claim 9, wherein the one or more memory devices are configured to authenticate the command by:
verifying the signature of the command using the public key that is associated with the private key, wherein the public key is accessible only to the one or more memory devices, wherein the one or more memory devices are configured to process the write command based at least in part on verifying the signature of the command.

11. The system of claim 9, wherein the computing node is configured to:
transmit the second command to the one or more memory devices after transmitting the command.

12. The system of claim 11, wherein receiving the second command comprises receiving the second command from the computing node, and wherein the one or more memory devices are further configured to:
disable write access to the portion of storage based at least in part on authenticating the second command using the public key.

13. The system of claim 12, wherein the one or more memory devices are configured to:
receive a second write command to an address of the portion of storage; and
refrain from processing the second write command based at least in part on disabling the write access to the portion of storage.

14. A system, comprising:
one or more memory devices configured to be allocated for write access, the one or more memory devices configured to:
receive a command from a computing node to enable write access to a portion of storage, wherein the command is signed using a private key accessible only by the computing node;
enable write access to the portion of storage based at least in part on authenticating the command using a public key;
receive a write command to an address of the portion of storage;
process the write command based at least in part on enabling write access to the portion of storage;
receive a second command for disabling the write access to only the portion of the one or more memory devices after processing the write command, wherein the second command is signed using the private key;
transmit a third command to the computing node, wherein the third command comprises an indication that the command was not authenticated, wherein the third command is signed using a private key that is specific to the one or more memory devices; and
transmit a fourth command to the computing node, wherein the fourth command comprises a key for verifying the third command, wherein the computing node is configured to:
receive the third command;
receive the fourth command;
verify the third command using the key received with the fourth command; and
re-transmit the command to the one or more memory devices based at least in part on the third command indicating that the command was not authenticated.

* * * * *